United States Patent Office 2,759,966
Patented Aug. 21, 1956

2,759,966
ESTERS OF PHENYL SUBSTITUTED DIHYDROXYBENZOIC ACIDS

Floyd L. Beman, Midland, Mich., assignor to The Dow Chemical Company, Midland, Mich., a corporation of Delaware No Drawing. Application July 9, 1953, Serial No. 367,086

6 Claims. (Cl. 260—473)

The present invention is concerned with the phenol, vinyl carbinol and alkanol esters of the phenyl substituted dihydroxybenzoic acids in which one hydroxyl is ortho to the carboxyl group, and the other hydroxyl is meta to the carboxyl group and is para to the first hydroxyl when the phenyl group is meta to said first hydroxyl. The compounds comtemplated by the present invention are the phenol, vinyl carbinol and alkanol esters of 3-phenyl-2,5-dihydroxybenzoic acid, 4-phenyl-2,5-dihydroxybenzoic acid, 5-phenyl-2,3-dihydroxybenzoic acid and 6-phenyl-2,5-dihydroxybenzoic acid. These compounds may be represented by the following formula

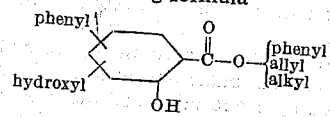

The new esters are crystalline solids or viscous liquids which are somewhat soluble in many organic solvents and of low solubility in water. They are useful as intermediates for the preparation of more complex organic derivatives and as active toxic constituents of parasiticide compositions. Representative members of the new ester compounds have been found to be of particular value as active toxic constituents of germicidal and disinfectant compositions for the control of *Salmonella typhosa* and *Staphylococcus aureus*. The use of the new compounds as intermediates for the preparation of certain useful derivatives is disclosed in my copending application, Serial No. 367,087, filed concurrently herewith, now U. S. Patent 2,716,663.

The new compounds may be prepared by reacting together (1) phenol, vinyl carbinol or an alkanol, (2) phosphorus oxychloride (POCl₃) and (3) a phenyl substituted dihydroxybenzoic acid in which one hydroxyl is ortho to the carboxyl group, and the other hydroxyl is meta to the carboxyl and is para to the first hydroxyl group when the phenyl group is meta to said first hydroxyl. Good results are obtained when employing one molecular proportion of the benzoic acid with at least one molecular proportion of the alcohol or phenol and at least 0.6 molecular proportion of phosphorus oxychloride. Although the exact mechanism of the reaction is not fully understood, it takes place smoothly at temperatures in excess of about 45° C. with the production of the desired ester compounds and hydrogen chloride of reaction.

In carrying out the reaction, the benzoic acid compounds and alcohol or phenol are mixed together and the phosphorus oxychloride added portionwise thereto at a temperature of from about 45° to 200° C. Following the addition, the reaction mixture is heated for a period of time at this same temperature range to complete the reaction. During the contacting period, hydrogen chloride of reaction may be separated and recovered from the reaction zone as formed. Upon completion of the reaction as is evidenced by the cessation of hydrogen chloride evolution, the reaction vessel and contents are cooled to room temperature. The desired products are usually crystalline solids and may be separated in conventional fashion, e. g. washing with water, washing with dilute aqueous sodium carbonate and recrystallization from various organic solvents. When the desired product does not precipitate as a crystalline solid, the washed reaction mixture may be fractionally distilled under reduced pressure and at temperatures gradually increasing up to a temperature of about 200° C. to separate low boiling constituents and obtain the product as a viscous liquid.

The new allyl and alkyl esters of the phenyl substituted dihydroxybenzoic acids may be prepared in an alternative method by reacting vinyl carbinol or an alkanol with the benzoic acid reagent. The reaction may be carried out in the presence of an esterification catalyst such as sulfuric acid. The amounts of the reactants to be employed are not critical, some of the desired product being produced with any proportion of ingredients. Good results are obtained when substantially equimolecular proportions of the reactants are employed. The employment of an excess of the alcohol coupled with the removal of water of reaction as formed, generally results in optimum yields. The reaction takes place smoothly at temperatures in excess of 45° C. and may be conveniently carried out at the boiling temperature of the reaction mixture and under reflux. Upon completion of the reaction, the desired ester product may be separated as previously described.

The following examples illustrate the invention but are not to be construed as limiting the same:

Example 1.—Methyl ester of 3-phenyl-2,5-dihydroxybenzoic acid 69 grams (0.3 mole) of 3-phenyl-2,5-dihydroxybenzoic acid, 38.4 grams (1.2 moles) of methanol and 11.2 milliliters of concentrated sulfuric acid where mixed together and the resulting mixture heated for about 7 hours at the boiling temperature and under reflux. The reaction vessel and contents were then cooled to room temperature and the reaction product washed three times with water. The washed product was then diluted with 200 milliliters of water and allowed to stand for about one hour. During the latter operation, a methyl 3-phenyl-2,5-dihydroxybenzoate product crystallized and was separated by filtration. The separated product was then suspended in water and the suspension neutralized by the addition of a small amount of sodium carbonate. The desired product was then separated by filtration, washed with water, dried and thereafter twice recrystallized from benzene. The recrystallized product had a melting point of 95°–96° C.

Example 2.—Methyl ester of 4-phenyl-2,5-dihydroxybenzoic acid 76.6 grams (0.33 mole) of 4-phenyl-2,5-dihydroxybenzoic acid, 124 grams (4 moles) of methanol and 18.5 milliliters of concentrated sulfuric acid were mixed together and the resulting mixture heated for 9 hours at the boiling temperature and under reflux. The reaction vessel and contents were then cooled to room temperature, the reaction mixture becoming a crystalline solid. The latter was washed three times with water, the aqueous mixture in the second washing operation being neutralized by the addition of a small amount of sodium carbonate. As a result of these operations, a methyl 4-phenyl-2,5-dihydroxybenzoate product was separated as a crystalline solid. The latter was recrystallized three times from cyclohexane and found to melt at 142°–144° C.

Example 3.—Normalbutyl ester of 3-phenyl-2,5-dihydroxybenzoic acid 46 grams (0.2 mole) of 3-phenyl-2,5-dihydroxy-benzoic acid, 89 grams (1.2 moles) of normalbutyl alcohol and 11.2 milliliters of concentrated sulfuric acid were mixed together and thereafter heated for about 8 hours at the boiling temperature of the mixture and under reflux. The mixture was then cooled to room temperature and washed twice with water, the aqueous mixture in the final washing operation being neutralized by the addition of a small amount of sodium carbonate. The normalbutyl alcohol was then recovered from the reaction mixture by fractional distillation, and the residue thereafter dispersed in 100 milliliters of a petroleum ether boiling at from 60° to 70° C. and the mixture cooled to about 0° C. A normalbutyl 3-phenyl-2,5-dihydroxybenzoate product precipitated in the cooled mixture after about 3 hours and was separated by filtration, washed with cold petroleum ether and dried. The dried product had a melting point of 44°–45.5° C.

*Example 4.—Normalbutyl ester of 4-phenyl-2,5-dihydroxybenzoic acid*

61.3 grams (0.2 mole) of 4-phenyl-2,5-dihydroxybenzoic acid, 89 grams (1.2 moles) of normalbutyl alcohol and 11.2 milliliters of concentrated sulfuric acid were mixed together and thereafter heated for about 8 hours at the boiling temperature of the mixture and under reflux. The reaction mixture was then washed three times with water, the aqueous dispersion in the second washing operation being neutralized by the addition of a small amount of sodium carbonate. The water employed in the third washing operation was extracted with methyl isobutyl ketone, and the solvent extract and washed product combined. The excess normalbutyl alcohol and methyl isobutyl ketone in the combined mixture was then separated from the mixture by fractional distillation under reduced pressure. The resulting residue was diluted with 100 milliliters of petroleum ether and thereafter cooled to 0° C. During the cooling a normalbutyl 4-phenyl-2,5-dihydroxybenzoate product precipitated as a crystalline solid. The latter was dried and washed twice at room temperature with petroleum ether. The washed product was then twice recrystallized from petroleum ether and found to melt at 63.0–64.5° C.

*Example 5.—Phenyl ester of 4-phenyl-2,5-dihydroxybenzoic acid*

153 grams (0.5 mole) of 4-phenyl-2,5-dihydroxybenzoic acid and 236 grams (2.5 moles) of phenol were mixed together and 61.5 grams (0.4 mole) of phosphorus oxychloride added portionwise thereto with stirring. The addition was carried out over a period of about 1.5 hours and at a temperature of from 125° to 180° C. Following the addition, the mixture was maintained at a temperature of about 180° C. for 1.75 hours to complete the reaction. Following the reaction, the reaction mixture was washed with water, a soft amorphous material separating in the washing step. The amorphous solid was washed two more times with water, the aqueous suspension in the first washing operation being neutralized by the addition of a small amount of dilute aqueous sodium hydroxide. The washed amorphous reaction product was then dispersed at room temperature in methanol, a phenyl 4-phenyl-2,5-dihydroxybenzoate product precipitating as a crystalline solid. Portions of the latter product were separately recrystallized from methanol and acetone, the addition of a few drops of water being required in each case to effect crystallization. The products from the above recrystallizations were then combined and the combined product recrystallized from a mixture of petroleum ether, cyclohexane and benzene and thereafter twice recrystallized from benzene. The recrystallized product had a melting point of 212°–212.2° C.

*Example 6.—Dodecyl ester of 3-phenyl-2,5-dihydroxybenzoic acid*

12 grams (0.05 mole) of 3-phenyl-2,5-dihydroxybenzoic acid, 37.2 grams (0.2 mole) of dodecyl alcohol and 2 milliliters of concentrated sulfuric acid were mixed together and thereafter heated for 24 hours at a temperature of about 80° C. The reaction mixture was then diluted with 200 milliliters of water and 160 milliliters of carbon tetrachloride and the resulting mixture neutralized to a pH of 7.5 by the addition of dilute aqueous sodium hydroxide. The neutralized mixture was distilled at gradually increasing temperatures up to a temperature of 100° C. to separate solvent and excess alcohol. The residue was thereafter extracted with a petroleum ether boiling at from 60° to 70° C. and the extract diluted with a few milliliters of acetone. Upon the addition of the acetone, the solvent extract separated into an aqueous layer and an oily layer. The latter was separated and the solvent removed therefrom by evaporation to obtain a dodecyl 3-phenyl-2,5-dihydroxybenzoic acid product as a residue. The latter was a viscous liquid having a refractive index n/D of 1.5169 at 25° C.

*Example 7.—Allyl ester of 3-phenyl-2,5-dihydroxybenzoic acid*

12 grams (0.05 mole) of 3-phenyl-2,5-dihydroxybenzoic acid, 23 grams (0.4 mole) of allyl alcohol and 2 milliliters of concentrated sulfuric acid were mixed together and the resulting mixture heated with stirring for 6 hours at a temperature of about 75° C. The mixture was then cooled to room temperature and washed three times with water, the aqueous mixture in the second washing operation being neutralized by the addition of a small amount of sodium carbonate. As a result of these operations, there was obtained an allyl 3-phenyl-2,5-dihydroxybenzoic acid product as a viscous brown liquid. The latter product was dissolved in 50 milliliters of benzene and the resulting solution successively washed with dilute aqueous sodium carbonate and water. The benzene was then separated by evaporation and the product dried and found to have a refractive index n/D of 1.6045 at 25° C.

*Example 8.—Methyl ester of 5-phenyl-2,3-dihydroxybenzoic acid*

46 grams (0.2 mole) of 5-phenyl-2,3-dihydroxybenzoic acid, 39 grams (1.2 moles) of methanol and 11.2 milliliters of concentrated sulfuric acid were mixed together and thereafter heated for 6 hours at a temperature of from 73° to 75° C. and under reflux. During the first part of the heating period 30 additional milliliters of methanol was added to the reaction mixture. Upon completion of the reaction, the reaction mixture was cooled to about 10° C., a methyl 5-phenyl-2,3-dihydroxybenzoic acid product precipitating as a crystalline solid. The latter was separated by filtration, washed three times with water, twice recrystallized from petroleum ether and found to melt at 117.5°–118° C.

*Example 9.—Ethyl ester of 6-phenyl-2,5-dihydroxybenzoic acid*

0.3 mole of 6-phenyl-2,5-dihydroxybenzoic acid, 1.0 mole of ethanol and 10 milliliters of concentrated sulfuric acid are mixed together and heated for 8 hours at the boiling temperature of the reaction mixture and under reflux. The reaction mixture is then washed three times with water, the aqueous mixture in the second washing operation being neutralized by the addition of a small amount of sodium carbonate. Upon cooling, an ethyl 6-phenyl-2,5-dihydroxybenzoate product precipitates in the reaction mixture as a crystalline solid and is separated by filtration.

The phenyl substituted dihydroxybenzoic acids, employed as starting materials, may be prepared by hydrolyzing a suitable halogenated phenyl-2-hydroxybenzoic acid. The hydrolysis is carried out in an aqueous alkaline medium and preferably in an aqueous solution of an alkali metal hydroxide. The reaction takes place smoothly at temperature of from 50° to 180° C. Upon completion of the hydrolysis, the reaction mixture is acidified with a mineral acid, the desired phenyl substituted dihydroxybenzoic acid product precipitating as a crystalline solid. The latter compounds and methods for their production constitute the subject matter of my copending application, Serial No. 367,087, filed concurrently herewith, now U. S. Patent 2,716,653.

The halogenated phenyl-2-hydroxybenzoic acids as described above may be prepared by halogenating a suitable phenyl substituted 2-hydroxybenzoic acid in glacial acetic acid as reaction medium. The halogenation takes place smoothly at temperatures of from about 40° to 115° C. In carrying out the reaction, bromine, chlorine or iodine chloride is contacted portionwise with the phenyl-2-hydroxybenzoic acid dissolved in acetic acid and under conditions of elevated temperature in the reaction vessel. Upon completion of the reaction, the mixture may be diluted with water to precipitate the halogenated phenyl-2-hydroxybenzoic acid product as a crystalline solid. These compounds and methods for their production are disclosed in a copending application, Serial No. 327,455, filed December 22, 1952.

I claim:

1. A compound selected from the group consisting of the phenol, vinyl carbinol and alkanol esters of the phenyl substituted dihydroxybenzoic acids in which one hydroxyl is ortho to the carboxyl group, and the other hydroxyl is meta to the carboxyl group and is para to the first hydroxyl when the phenyl group is meta to said first hydroxyl.
2. Methyl 3-phenyl-2,5-dihydroxybenzoate.
3. Normalbutyl-3-phenyl-2,5-dihydroxybenzoate.
4. Phenyl 4-phenyl-2,5-dihydroxybenzoate.
5. Methyl 4-phenyl-2,5-dihydroxybenzoate.
6. Allyl 3-phenyl-2,5-dihydroxybenzoate.

References Cited in the file of this patent

UNITED STATES PATENTS

| | | |
|---|---|---|
| 1,839,526 | Bass et al. | Jan. 5, 1932 |
| 2,594,350 | Sahyun | Apr. 29, 1952 |